United States Patent [19]

Bucholtz et al.

[11] Patent Number: 5,635,916

[45] Date of Patent: Jun. 3, 1997

[54] ELECTRONIC SECURITY SYSTEM

[75] Inventors: Robert A. Bucholtz, Lewisville; Jim B. Ferguson, Arlington, both of Tex.

[73] Assignee: IntelliTouch 2000, Inc., Dallas, Tex.

[21] Appl. No.: 462,577

[22] Filed: Jun. 5, 1995

Related U.S. Application Data

[62] Division of Ser. No. 967,995, Oct. 28, 1992, Pat. No. 5,422,632.

[51] Int. Cl.$^6$ .............................. G06F 7/04; B60R 25/04
[52] U.S. Cl. .................. 340/825.31; 340/426; 307/10.3; 70/267
[58] Field of Search .......................... 180/287; 307/10.3, 307/10.5; 340/426, 539, 825.31, 825.69; 361/172; 235/382.5; 70/267

[56] References Cited

U.S. PATENT DOCUMENTS

| | | | |
|---|---|---|---|
| 4,209,782 | 6/1980 | Donath et al. | 235/382.5 |
| 4,646,080 | 2/1987 | Genest et al. | 340/825.31 |
| 4,754,255 | 6/1988 | Sanders et al. | 340/825.31 |
| 5,021,776 | 6/1991 | Anderson et al. | 340/825.31 |
| 5,157,375 | 10/1992 | Drori | 340/426 |
| 5,377,270 | 12/1994 | Koopman, Jr. et al. | 340/825.31 |
| 5,481,253 | 1/1996 | Phelan et al. | 340/825.31 |

Primary Examiner—Michael Horabik
Assistant Examiner—William H. Wilson, Jr.
Attorney, Agent, or Firm—Harris, Tucker & Hardin, P.C.

[57] ABSTRACT

Electronic security system for controlling access to an automotive vehicle. The security system includes a computer system having a processor subsystem connected to selectively enable or disable an ignition system of the automobile and a memory subsystem having ignition, valet and reprogramming key codes and first, second and third validation codes stored therein. To control access to the vehicle, an encoded signal containing a device code and an authorization code is propagated to the processor subsystem where the codes are compared to the ignition key, valet key, reprogramming key and validation codes. If the propagated device and authorization codes match the ignition key and first validation codes, the processor subsystem enables the ignition system for a pre-selected time period. If the propagated device and authorization codes match the valet key and second validation codes, the processor subsystem enables the ignition system. Finally, if the propagated device and authorization codes match the reprogramming key and third validation codes, the processor subsystem reprograms the memory subsystem to modify the key and/or validation codes.

13 Claims, 4 Drawing Sheets

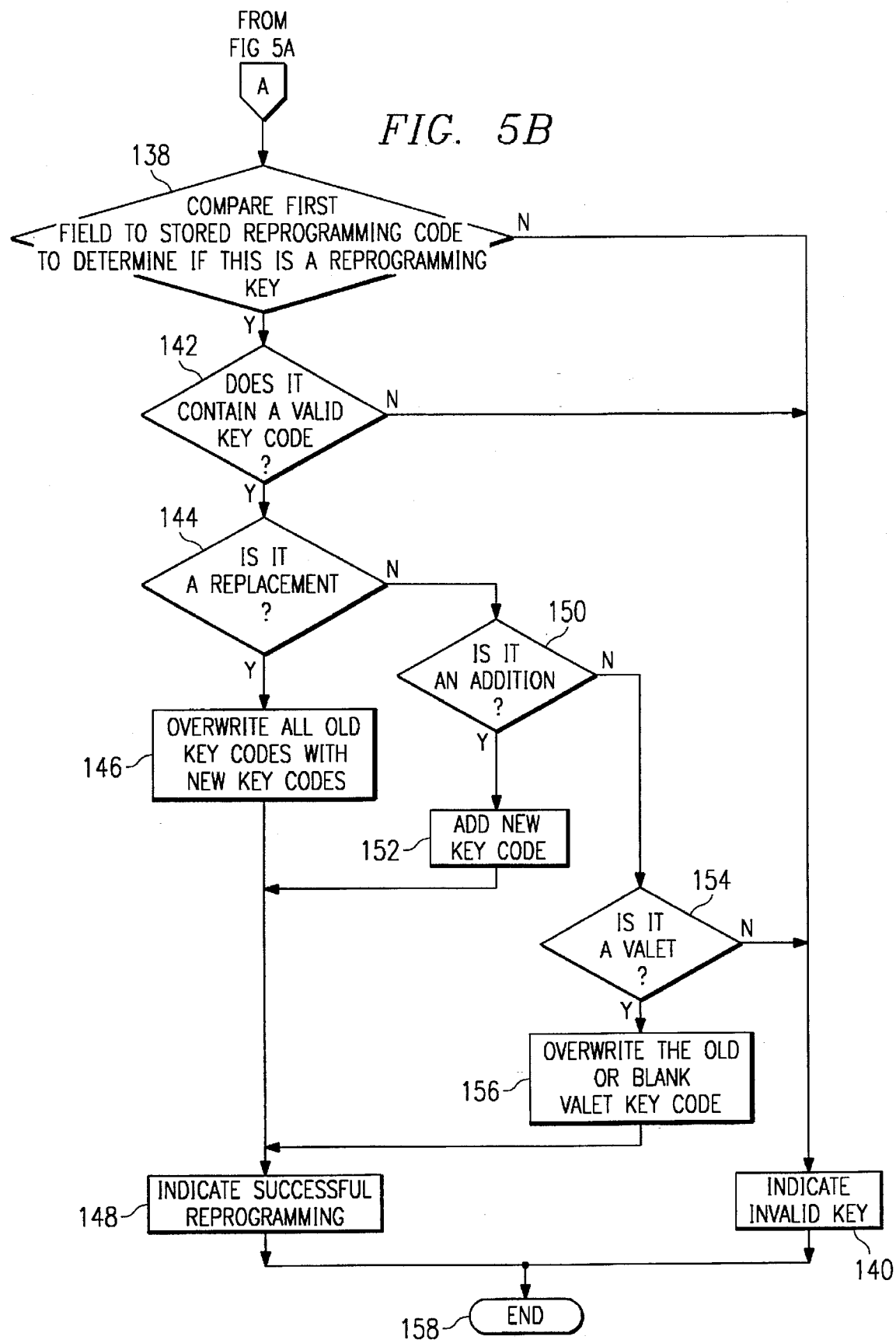

ELECTRONIC SECURITY SYSTEM

This is a division, of application Ser. No. 07/967,995, filed Oct. 28, 1992 now U.S. Pat. No. 5,422,632.

BACKGROUND OF THE INVENTION

1. Field of the Invention

This invention relates to an electronic security system for controlling access to electrically actuated devices and/or systems such as automotive vehicle and, more particularly, to a microprocessor controlled electronic security system for an automotive vehicle which incorporates plural contact actuatable, preprogrammed memory devices which provide authorization and/or reprogramming codes for controlling the operation of the access controlling electronic security system.

2. Description of Related Art

Security systems for automobiles and other mechanically driven vehicles have traditionally included two security features—door and ignition locking systems. The door lock limits access to the operator's compartment to those persons possessing a key mechanically configured to unlock the door lock. Similarly, the ignition lock prevents the unauthorized engagement of the vehicle's engine and drive system except by those persons possessing a key mechanically configured to disengage the ignition locking system. While such systems have enjoyed limited success in preventing unauthorized use of motor vehicles, the large number of vehicle thefts clearly show that such security systems are often inadequate.

To further secure the automobile, numerous secondary security systems, many of which have focussed on the ignition system, have been proposed. One such system is the so-called "kill" switch which is used to interrupt the electrical connection between the ignition locking system and the engine and drive system. Once installed in an automobile, turning the ignition key will not activate the engine unless the kill switch is closed. In most cases, the kill switch is carefully shielded from view, thereby making it difficult for potential thieves or other unauthorized users from closing the switch and enabling the ignition switch.

Conceptually similar to kill switches are the use of plug connectors in combination with an interruption of the electrical connection between the ignition locking system and the engine and drive system. Again, the aforementioned electrical connection is interrupted. However, rather than installing a switch capable of selectively completing the broken electrical connection, a prong-receiving socket is inserted into the break. When inserted into the socket, a corresponding prong will complete the electrical connection, again enabling the ignition switch. Like kill switches, plug and socket system are often carefully shielded from view. However, once located, plug and socket systems are superior to kill switches in that the potential thief or other unauthorized user must either somehow complete the electrical connection inside the socket or re-route the electrical connection around the socket before the ignition system will be enabled.

One deficiency common to both primary ignition key systems and secondary plug and socket security systems is the relatively small family of keys which are available. For example, while a key capable of unlocking an ignition lock has a relatively complicated shape, mechanical limitations in the shape of the lock and key systems, particularly in light of mass manufacturing needs, severely limit the number of possible shapes in which the key may be formed. As a result, a collection of 40 or so keys can unlock the majority of automobiles built by a single manufacturer. Similar problems plague the plug and socket security systems where only a limited number of complimentary plug and socket shapes are in use.

SUMMARY OF THE INVENTION

In one embodiment, the present invention is of an electronic security system for enabling an electrically actuatable system. The security system comprises a relay electrically associated with the system such that the system is disabled when the relay is open and enabled when the relay is closed, and controller means for controlling the opening and closing of the relay. The controller means further comprises means for determining whether a received encoded signal is authorized to enable the system and means for closing the normally open relay if the received encoded signal is authorized to enable the system.

In one aspect of the invention, the controller means further comprises means for determining whether the received encoded signal is authorized to enable the system or authorized to enable the system for a preselected time period and the means for closing the relay further comprises means for closing the relay if the received encoded signal is authorized to enable the system and means for closing the relay for a preselected time period if the received encoded signal is authorized to enable the system for the preselected time period. In another aspect, the electronic security system further comprises storage means for storing at least one validation code and means for comparing the stored validation codes with the received encoded signal to determine whether the encoded signal is authorized to enable the system. In yet another aspect, the controller means further comprises means for determining whether the received encoded signal is authorized to reprogram the storage means and means for propagating additional validation codes to the storage means. Depending on the type of reprogramming to be performed, selective overwriting means will either overwrite the existing validation codes using the additional validation codes or store the additional validation codes in the storage means.

In another embodiment, the present invention is of a method of selectively enabling an ignition system for an automotive vehicle after the ignition system has been disabled by a computer of an electronic security system. An authorization code is first propagated to the computer where it is determined whether the propagated authorization code is authorized to enable the disabled ignition system. If the propagated authorization code is authorized to enable the disabled ignition system, the computer then generates an enabling signal to the disabled ignition system. In one aspect of this embodiment of the invention, at least one authorization code authorized to enable the disabled ignition system is stored in a memory subsystem of the computer. A processor subsystem of the computer compares the propagated authorization code to the stored authorization code to determine if the propagated authorization code is authorized to enable the disabled ignition system and, in another aspect of this embodiment of the invention, the first authorization code stored in the memory subsystem is only authorized to enable the disabled ignition system for a preselected time only and a second authorization code authorized to enable the disabled ignition system is also stored in the memory subsystem. In this aspect, the computer then determines whether the authorization code propagated to the processor subsystem is only authorized to enable the disabled ignition system for the preselected time period or is authorized to enable the disabled ignition system. The computer then enables the ignition system accordingly.

In another aspect of this embodiment of the invention, if the computer only enables the disabled ignition system for the preselected time period, the preselected time period is set and the disabled ignition system enabled. After the ignition system has been enabled, the method of the present invention repeatedly determines if the enabled ignition system has been switched on. If it is determined that the ignition system has been switched on, the time period is reset. Otherwise, the enabled ignition system is disabled when the preselected time period expires. Finally, in yet another aspect of this embodiment of the invention, if the propagated authorization code matched the second stored authorization code and the ignition system enabled, a second authorization code may then be propagated to the computer. The second propagated authorization code is then compared to the first stored authorization code and, if the second propagated authorization code matches the first stored authorization code, the enabled ignition system is then re-enabled for the preselected time period only.

In yet another embodiment, the present invention is of a method for controlling access to an automotive vehicle having an ignition system which controls the operation thereof. A computer having processor and memory subsystems connected for bi-directional data transfers therebetween is electrically connected to the ignition system such that output signals propagated by the processor subsystem may selectively enable or disable the ignition system and first and second device codes, as well as an authorization code, are stored in the memory subsystem. An encoded signal having first second fields is then propagated to the processor subsystem. The first field of the propagated encoded signal is compared to the first device code to determine if the propagated encoded signal is an enablement signal and, if so, the second field of the propagated encoded signal is compared to the authorization code to determine if the enablement signal is authorized to enable the disabled ignition system. If, however, the propagated encoded signal is not an enablement signal, the first field of the propagated encoded signal is then compared to the second device code to determine if the propagated encoded signal is a reprogramming signal. If so, the second field of the propagated encoded signal is compared to the authorization code to determine if the reprogramming signal is authorized to reprogram the computer and, if authorized, the reprogramming signal modifies the data stored in the memory subsystem.

In one aspect of this embodiment of the invention, reprogramming is accomplished by propagating a second authorization code to the processor subsystem which overwrites the first authorization code with the second authorization code. In another aspect, the second authorization code is stored in the memory subsystem together with the first authorization code. In yet another aspect, the first and second authorization codes stored in memory are authorized to enable the disabled ignition system and authorized to enable the disabled ignition system only for a preselected time period, respectively. In a final aspect of this embodiment of the invention, first and second authorization codes are authorized to enable the ignition system only for a pre-selected time period and to enable the ignition system, respectively, and reprogramming is accomplished by propagating a third authorization code to the processor subsystem where the second authorization code is overwritten with the third authorization code.

In another embodiment, the present invention is of an electronic security system for controlling access to an automotive vehicle having an ignition system. The security system includes first and second contact memory devices, each having first and second conductive exterior surfaces and a memory subsystem electrically connected between the first and second conductive surfaces, and a contact pad having first and second conductive exterior surfaces. Stored in the memory subsystem for the first contact memory device is a first encoded signal having a first device identification code which identifies the first contact memory device as an ignition key and a first authorization code and stored in the memory subsystem for the second contact memory device is reprogramming data and a second encoded signal having a second device identification code which identifies the second contact memory device as a reprogramming key and a second authorization code. When a contact memory device contacts the contact pad, the encoded signal stored therein is propagated, via said contact pad, to a computer system having processor and memory subsystems interconnected for bi-directional exchanges of data therebetween. Stored in the computer memory subsystem is an ignition key code, a reprogramming key code and first and second validation codes. The computer processor subsystem further includes means for comparing device codes from the contact memory devices to the ignition and reprogramming key codes stored in the computer memory subsystem and means for comparing authorization codes from the contact memory devices to the validation codes stored in the computer memory subsystem. If the device and authorization codes match the ignition key and first validation codes, respectively, the ignition system is enabled by a normally open relay electrically associated with the ignition system by assertion means which close the relay. If, however, the device and authorization codes match the reprogramming key and second validation codes, respectively, reprogramming means reprogram the memory subsystem to modify the key and/or validation codes using reprogramming data stored in the memory subsystem of the second contact memory device.

In one aspect of this embodiment of the invention, a third contact memory device having a memory subsystem in which a third encoded signal having the first device code and a third authorization code which identifies the third contact memory device as a valet ignition key is further provided. In this aspect of the invention, the computer memory subsystem further includes a third validation code stored therein and the computer processor subsystem further includes assertion means for closing the relay for a pre-selected time period if the device and authorization codes match the ignition key and first validation codes, respectively, and assertion means for closing the relay if the device and authorization codes match the ignition key and the third validation codes, respectively.

BRIEF DESCRIPTION OF THE DRAWING

The present invention may be better understood, and its numerous objects, features and advantages will become apparent to those skilled in the art, by reference to the accompanying drawing in which:

FIG. 5A–B is a flow chart illustrating the logic flow for the electronic security system of FIG. 3.

DETAILED DESCRIPTION

Figure 1A:
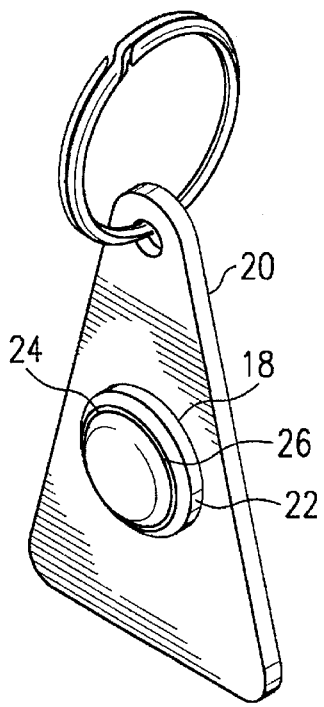
FIG. 1A is a perspective view of a contact actuatable memory device configured as a electronic key for use as part of an automotive security system constructed in accordance with the teachings of the present invention.
Figure 1B:
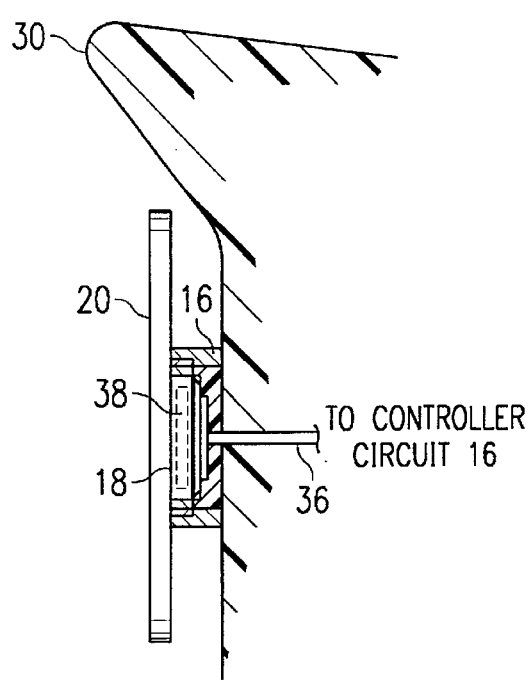
FIG. 1B is a side view of a vehicle dashboard having an actuator pad for contacting the memory device of FIG. 1A configured as an electronic key pad for use as part of the automotive security system subject of the present invention.
Figure 2:
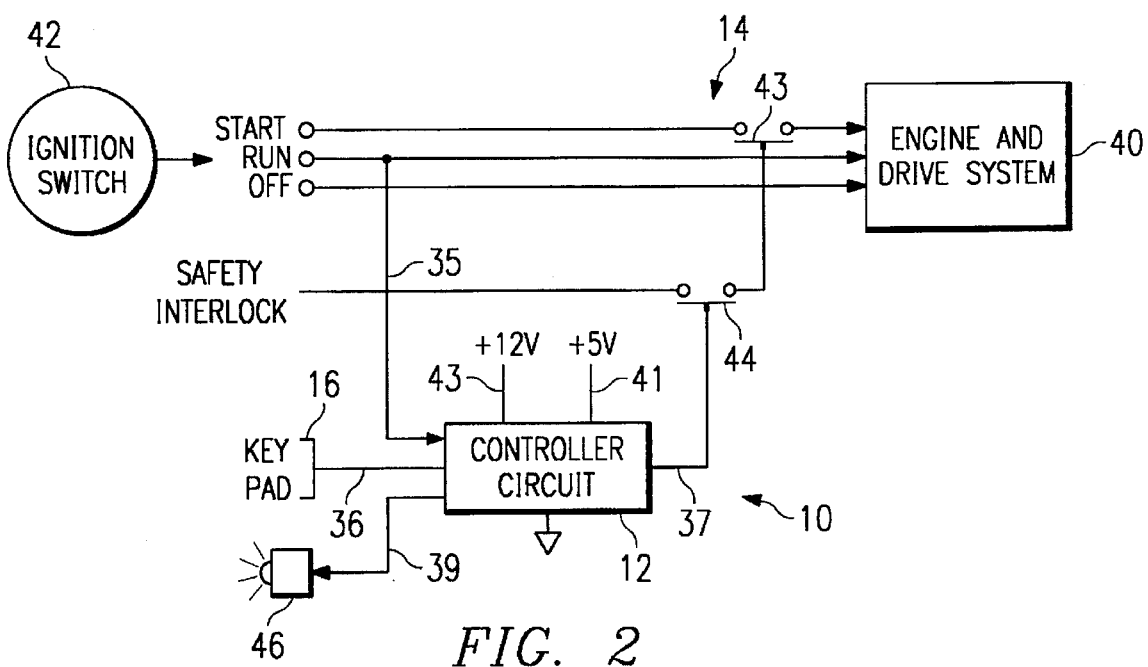
FIG. 2 is a schematic diagram of an electronic security system constructed in accordance with the teachings of the present invention and interconnected with a conventional ignition system for an automotive vehicle for the selective enablement and disablement thereof.

Referring first to FIGS. 1A, 1B and 2, an electronic security system 10 shall now be described in greater detail. It should be noted, however, that while the foregoing detailed description illustrates the electronic security system 10 as a system for controlling access to an automotive vehicle by selectively enabling and disabling the ignition system of the vehicle, it is specifically contemplated that the electronic security system 10 is suitable for limiting access to a wide variety of electrically actuated devices simply by interconnecting normally open relay 44 with the electrical system such that the device and/or system cannot be actuated unless the relay 44 is closed. The security system 10 is comprised of a controller circuit 12 installed in a inaccessible location within the vehicle, for example, in the engine compartment, and interconnected with the vehicle's ignition system 14 in a manner to be more fully described below such that the vehicle' engine and drive system may be selectively enabled or disabled, an electronic key pad 16 installed in the passenger compartment of the vehicle and electrically connected with the controller circuit 12 and an electronic key 18 to be carried by an authorized operator of the vehicle.

Referring now to FIGS. 1A–B, the electronic key 18 and key pad 16 shall now be described in greater detail. The electronic key 18 which, for example, may be fixedly mounted to a key chain 20 of conventional design for easy carrying by an authorized operator of the vehicle is generally disc-shaped and includes a conductive sidewall surface 22 which outwardly projects away from the key chain 20 and a conductive front side surface 24 separated from the conductive sidewall surface 22 by a layer 26 of an insulative material. Conversely, the electronic key pad 16 is comprised of a conductive outer shell 28 fixedly mounted to a dashboard 30 located in the passenger compartment of the vehicle and projecting outwardly therefrom to define an accessible interior space. Provided within the interior of the conductive outer shell 28 is an inner conductive surface 32 separated from the conductive outer shell 28 by a layer 34 of insulative material. The conductive inner surface 32 is connected to the controller circuit 16 via an electrical connector 36 and the conductive outer shell is connected to ground via an electrical connection not shown.

Mounted in the interior of the electronic key 18, and illustrated in phantom in FIG. 1B, is a memory system 38, for example, a programmable random access memory (or "RAM") system or a non-volatile random access memory (or "NVRAM") system, electrically connected to the conductive front side surface 24 and the conductive sidewall surface 22 by connection means (not shown). The aforementioned types of memory systems mounted in a cylindrical housing and electrically connected between the front sidewall surfaces are commercially available from Dallas Semiconductor of Dallas, Tex. which, when configured in the manner described below, may be used to control access to an automotive vehicle having the electronic security system 10 installed therein.

More specifically, in accordance with the security system disclosed herein and to provide full control of access to the automotive vehicle, it is contemplated that the security system should include plural key types—ignition, security system disable (or "valet") and reprogramming. When used, the ignition key will permit an authorized operator of the vehicle to enable the ignition system for a pre-selected time period sufficient for the operator to start the vehicle. The valet key, on the other hand, permits an authorized operator of the vehicle to enable the ignition system indefinitely by disabling the security system, thereby permitting the vehicle to be operated normally as if no security system had been installed. Finally, the reprogramming key permits an authorized operator to replace authorized ignition or valet keys with new keys or add new ignition or valet keys.

An ignition or valet key may be configured using a Model DS-1990 touch memory device manufactured by Dallas Semiconductors of Dallas, Tex. Such a touch memory device has a memory sized to contain 64 bits of data which, when contacted in the manner described herein, would be propagated to the device contacted therewith. A touch memory device as described herein may be converted into an electronic ignition key by storing, in the memory system 38, a key enable code to be used to control the operation of the electronic security system 10. More specifically, the key enable code is a 64 bit word arranged in accordance with the format illustrated in FIG. 4. The 8-bit device code is used to distinguish reprogramming keys used to modify the list of keys authorized to enable the ignition system and keys, both ignition and valet, actually authorized to enable the ignition system. A first 8-bit code would be selected to identify an electronic key 18 as either an ignition or valet key and a second 8-bit code would be selected to identify an electronic key 18 as a reprogramming key. Presuming that the 8-bit device code identifies the electronic key as a key authorized to enable an ignition system, the 48-bit authorization code is used to both specify the identity of the key, either ignition or valet, and whether that key has been authorized to enable the ignition system using a matching technique to be more fully described below. It is contemplated that the majority of consumers will prefer that an electronic security system be provided with two ignition keys and, for this reason, it is expected that the electronic security system 10 will be configured such that either of two electronic keys 18 will enable the ignition system. It is further contemplated, however, that the security system will be readily upgradable such that three ignition keys and one valet key will be authorized to enable the ignition system. As will be readily appreciated by one skilled in the art of automobile security systems, the use of the aforementioned 48-bit authorization code, in combination with the relatively few number of authorization codes to be used by a single consumer, will permit the manufacturer of a single locking system to produce a nearly unlimited supply of locking systems without possibility of distributing locking systems to two consumers for which the keys are interchangeable with each other.

It is further recognized that, in order to meet the versatile needs of the consumer, the electronic security system must be readily reprogrammable so that the list of authorization codes which will enable the ignition system may be readily modified. To do so, a reprogramming key for changing or adding authorization codes for ignition or valet keys may be configured using a Model DS-1992 touch memory device manufactured by Dallas Semiconductors of Dallas, Tex.

Like the DS-1990, the DS-1992 has a memory system which includes a 64-bit touch memory which, when contacted in the manner described herein, would be propagated to the device contacted therewith. Unlike the DS-1990, however, the memory system for the DS-1992 touch memory device further includes a 1,024 bit non-touch memory component which may be accessed by a DMA request issued by a microprocessor electrically connected to the front side surface thereof but which will not be propagated upon the simple completion of an electrical connection. To produce a reprogramming key using a Model DS-1992 touch memory device, the previously described 64-bit code propagated upon contact with a second device should be modified such that the 8-bit device code identifies the key 18 as a reprogramming key and the 48-bit authorization code is used to confirm that the reprogramming key is authorized to reprogram the security system 10. Finally, the 1,024 bit non-touch memory component of the memory system should contain programming data to be more fully described below and for which the exact contents will vary depending on the desired reprogramming.

To operate the electronic security system 10, the electronic key 18 and key pad 16 are contacted in the manner illustrated in FIG. 1B. More specifically, the electronic key 18 is inserted in the interior opening of the key pad 16 such that the front side surface 24 contacts the inner conductive surface 32 and the sidewall surface 22 contacts the outer shell 28. When contacted in this manner, the contents of the touch memory component of the memory system 38 are propagated via the conductor 36 to the controller circuit 12 to provide data which controls the operation of the automotive security system 10.

Referring next to FIG. 2, the interconnection between the present invention of an electronic security system 10 and an associated ignition system 14 of an automotive vehicle will now be described in greater detail. As is well known in the art, a typical automotive vehicle includes an engine and drive system 40 controlled by an ignition system 14 which includes an ignition switch 42 switchable between START, RUN and OFF positions, each of which interconnects the ignition switch 42 and the engine and drive system 40 in a different manner. When moved into the START position, the ignition switch 42 closes a switch (not shown) which connects the battery and starter components of the engine and drive system 40, thereby starting the engine. Once the engine starts, the ignition switch 42 is moved to the RUN position, thereby disconnecting the battery while maintaining power through certain electrical components of the engine and drive system 40 continuously powered while the ignition system 42 is kept in the RUN position. Finally, in the OFF position, the ignition switch 42 disconnects the electrical components of the engine and drive system 40, thereby turning the engine and drive system 40 off. The engine and drive system 14 for an automotive vehicle further includes a SAFETY INTERLOCK line which prevents the engine and drive system 40 from being started when the vehicle is in gear. Typically, the SAFETY INTERLOCK line connects a contact located within the transmission system (not shown) and a relay 43 included as part of the START interconnection between the ignition switch 42 and the engine and drive system 40. If the transmission is in drive or reverse, the relay 43 opens, thereby disengaging the interconnection between the ignition switch 42 and the engine drive system 40 produced when the ignition system is switched into the START position and preventing the starting of the engine. If, however, the transmission is in park or neutral, the relay 43 is closed, thereby re-engaging the interconnection between the ignition switch 42 and the engine and drive system 40 so that the ignition system 14 can start the engine and drive system 40 when the ignition switch 42 is switched into the START position. The above description of the SAFETY INTERLOCK line, the ignition switch 42, the numerous automotive components collectively referred hereto as the engine and drive control system 40 and the interaction between these systems is by no means intended to be a comprehensive description of such systems but is sufficient for the purposes of describing the interconnection between the present invention of an electronic security system and conventional components of an automotive vehicle well documented in the art.

As may be further seen in FIG. 2, the controller circuit 12 includes a first input line 35 connected to the interconnection between the ignition switch 42 and the engine and drive system 40 produced when the ignition switch 42 is switched to the RUN position and used to inform the controller circuit 12 when the engine and drive system 40 are running, the second input line 36 connected to the key pad 16 and used to propagate ignition and reprogramming key enable codes to the controller circuit 12, a first output line 37 connected to a normally open relay 44 installed along the SAFETY INTERLOCK line and used to selectively enable or disable the ignition system 14 by closing or opening the relay 44 whenever the ignition key enable code received by the controller circuit 12 is authorized to enable or disable the ignition system 14, and a second output line 39 connected to display means 46, for example, a light emitting diode (or "LED") installed in the operator compartment of the vehicle in a readily visible location, for example, the dashboard 30. The display means 46 is used to provide information to the operator of the vehicle regarding the status of the attempted operation of the controller circuit 12. For example, upon successful transmission of a valid authorization code, the controller circuit 12 will turn the display means 46 on for a predetermined time period. On the other hand, upon either an unsuccessful transmission of an authorized key enable code or successful transmission of an unauthorized key enable code, the controller circuit 12 will cause the display means 46 to flash on and off for the predetermined period. Finally, +5 and +12 volt power supply lines 41, 43 are provided to power the controller circuit 12.

Figures 3, 4:
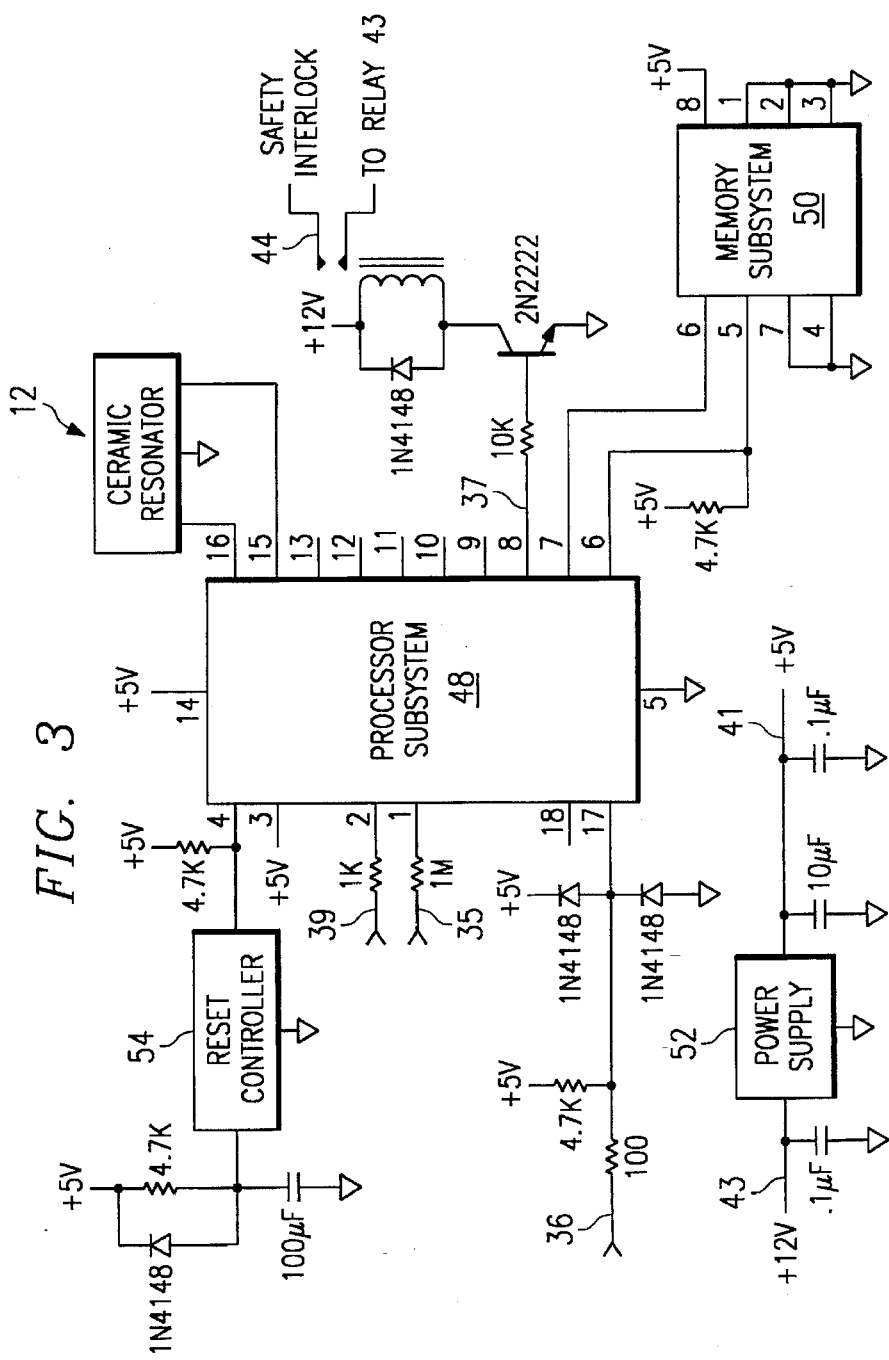
FIG. 3 is a circuit diagram of the electronic security system of FIG. 2.
FIG. 4 is a diagram of the configuration of the key enable code.

Referring next to FIG. 3, the controller circuit 12 will now be described in still greater detail. As may now be seen, the controller circuit 12 further includes a processor subsystem 48 electrically connected to a memory subsystem 50 for bi-directional transfers of data therebetween. In the embodiment disclosed herein, the processor subsystem 48 is an 18 pin, type PIC16C54 microprocessor and the memory subsystem 50 is an 8 pin, type 24LCO1 electrically erasable programmable read only memory (or "EEPROM"), both manufactured by Microchip.

More specifically, pin 1 of the processor subsystem 48 is connected to the input line 35 which, as previously mentioned, connects to the interconnection between the ignition system 14 and the engine and drive system 40 produced when the ignition switch 42 is switched to the RUN position. As the various components of the engine and drive system 40 are powered in this setting, a voltage which, when input to the processor subsystem 48, informs the processor subsystem 48 when the engine and drive system 40 are running is present along input line 35. Pin 2 is connected to the output line 39, through which the processor subsystem 48 may selectively turns LED 46 on and off to indicate to an operator of the vehicle whether the contents of the electronic key 18 has been read by the processor subsystem 50. Pins 3, 4 and 14 are connected to the +5 volt output line 41 of power supply 52 which, in the embodiment disclosed herein, is a type LM2936 power supply manufactured by National Semiconductor. Pin 4 is also connected to reset controller 54 which resets the processor subsystem 48 after each time an electronic key 18 is used to perform a successful transmission of a valid authorization code for an ignition or reprogramming key, an unsuccessful transmission of an authorized key enable code for an ignition or reprogramming key or a successful transmission of an unauthorized key enable code for an ignition or reprogramming key and which, in the embodiment disclosed herein, may be a type S8054-HNM reset controller manufactured by Seiko. Pin 5 is connected to ground. Pins 6 and 7 are connected to the memory subsystem 50. Pin 8 is connected to output line 37 which, as previously discussed is connected to normally open relay 44 such that, by driving pin 8 high, the processor subsystem 48 will close the relay 44, thereby enabling the ignition system 14. Pins 9, 10, 11, 12, 13 and 18 are unconnected. Pins 15 and 16 are connected to ceramic resonator 56 which controls the frequency at which the processor subsystem 48 operates and which may be a type EFO-GC4004A4 ceramic resonator manufactured by Panasonic. Finally, pin 17 is connected to the input line 36 which, as previously discussed, is used to propagate ignition and reprogramming key enable codes to the processor subsystem 48 to initiate the operation thereof in accordance with the method more fully described in FIGS. 5A–B.

For the memory subsystem 50, pins 1, 2, 3, 4 and 7 are connected to ground, pins 5 and 6 are connected to pins 6 and 7 of the processor subsystem 48, respectively, for bi-directional transfers of data therebetween, and pin 8 is tied to the +5 volt output line 41. Originally stored in the memory subsystem 50 are first and second 8-bit device codes, first and second 48-bit ignition key validation codes, a 48-bit valet key validation code, a 48-bit reprogramming key validation code, a 48-bit replacement type reprogramming validation code, a 48-bit addition type reprogramming validation code and a 48-bit valet type reprogramming validation code.

Figure 5A:
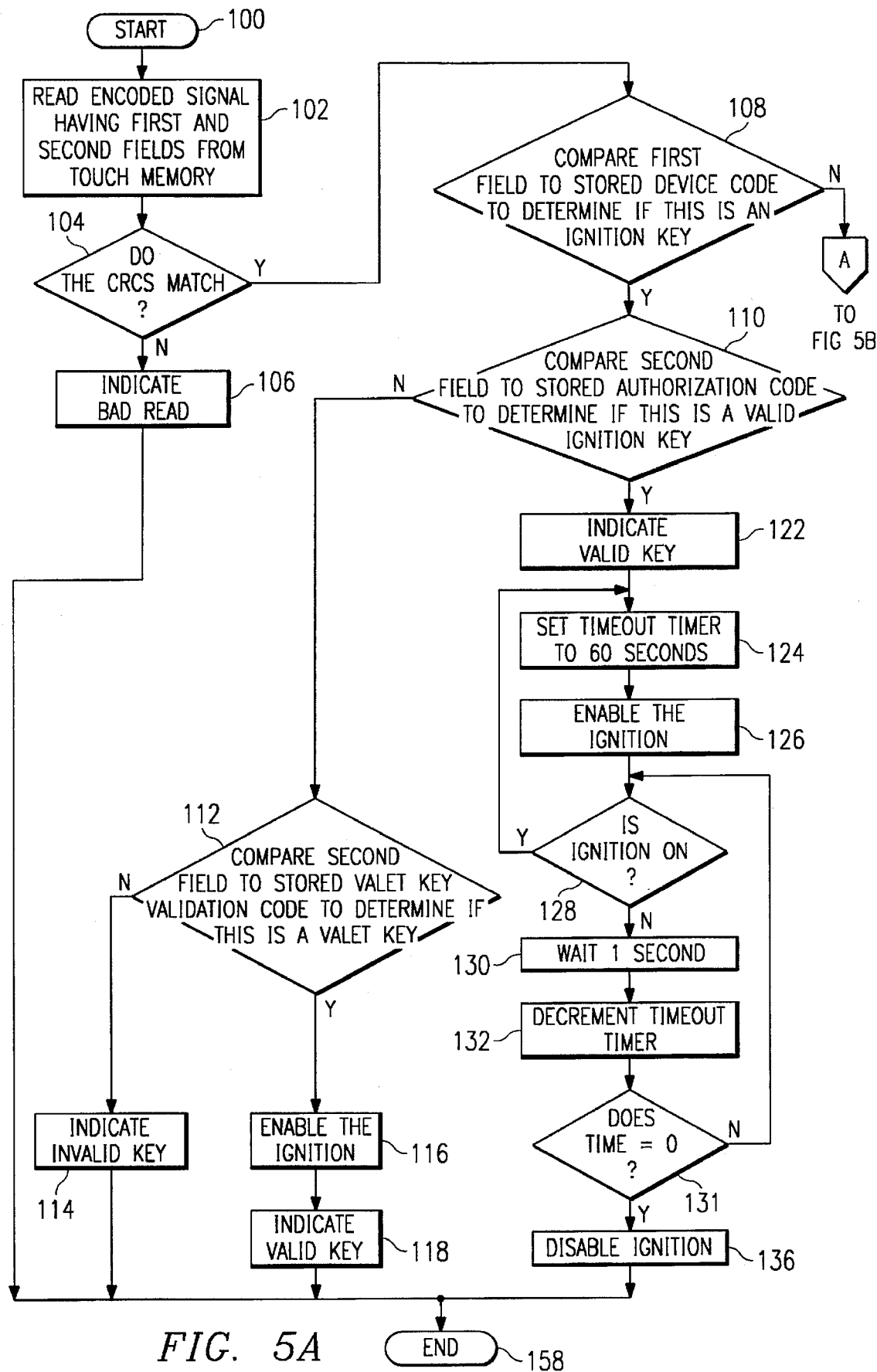

Referring next to FIGS. 5A–B, the method for controlling access to an automotive vehicle using the electronic security system 10 of FIGS. 2 and 3 will now be described in greater detail. As previously set forth, the relay 44 is normally open and the automotive vehicle associated with the electronic security system 10 is disabled. The method commences at step 100 by initiating contact between the front side surface 24 of the electronic key and the conductive inner surface 32 of the electronic key pad 16. Upon contact, the memory system 38 transmits a 64-bit key enable code of an, as yet undetermined key type formatted as previously described in FIG. 4 to pin 17 of the processor subsystem 48 at step 102.

Upon receipt of the 64-bit key enable code, the processor subsystem 48 determines at step 104 whether the device and authorization codes contained in the propagated key enable code were successfully transmitted to the processor subsystem 48 or were corrupted during transmission, either by a single-bit error or by an error burst. More specifically, the processor subsystem 48 performs a cyclic redundancy check (or "CRC") on the device and authorization codes by computing a numeric value from the bits transmitted to the processor subsystem 48 as the device and authorization codes and comparing the determined numeric value to a previous computation of the value which was appended to the device and authorization codes, stored in the memory system 38 and propagated to the processor subsystem 48 as the CRC checksum. If it is determined at step 104 that the CRC checksum does not match the CRC numeric value determined by the processor subsystem 48, it is determined that there was an error in propagating the data stored in the memory system 38 to the processor subsystem 48 and the received data cannot be used to enable the vehicle. Accordingly, at step 106, the processor subsystem 48 indicates a bad data read by instructing the LED 46 to flash, i.e. to blink on and off for a predetermined time period, for example, 5 seconds, and afterward ending the attempted read at step 158 where the processor subsystem 48 will reset and await another attempted transmission of a key enable code.

Returning to step 104, if, however, the checksum and determined numeric value match, the processor subsystem 48 determines that the data stored in the memory system 38 was accurately propagated to the processor subsystem 48 and the method of the present invention proceeds to step 108 where the processor subsystem 48 will process the received key enable code. At step 108, the processor subsystem 48 identifies the type of key 18 which has contacted the key pad 16 by analyzing the received key enable code. Specifically, the key may either be an ignition key or a reprogramming key. As previously stated, the first field of the key enable code propagated to the processor subsystem 48 is a device code which is used to identify whether the key 16 is an ignition key or a reprogramming key. Here, the processor subsystem 48 compares the 8-bit device code received from the key 16 to an 8-bit ignition key device code stored in the memory subsystem 50. If the codes match, the processor subsystem 48 determines that the key 16 propagating the received key enable code is an ignition key and proceeds to step 110 where the key enable code 16 will be further analyzed.

Proceeding to step 110, the processor subsystem 48 next determines whether the key 16, now identified as an ignition key is valid, i.e. is a key which has been previously authorized to be used to enable the ignition system. To make this determination, the processor subsystem 48 compares the 48 bit authorization code transmitted by the memory system 38 to the two authorized ignition key validation codes previously stored in the memory subsystem 50. If the authorization code matches either of the two ignition key validation codes stored in the memory subsystem 50, the processor subsystem 48 determines that the key 16 is an ignition key which has been previously authorized for enabling the ignition system. If, however, the authorization code fails to match either of the two ignition key enable codes stored in the memory subsystem 50, the method proceeds to step 112 for further analysis of the key enable code.

At step 112, the processor subsystem 48 determines whether the key 16, which in now known to be other than an authorized ignition key, is a valet key, i.e. a key which has been authorized to enable the ignition system 14 for an indefinite time period to either permit the use of the vehicle by a valet or the disengagement of the security system 10 until re-engaged. Accordingly, at step 112, the processor subsystem 48 compares the received authorization code to a 48-bit valet key validation code stored in the memory subsystem 50. If the authorization code fails to match the valet key validation code, the processor subsystem 48 determines that the key 16, while an ignition key, has never been authorized for use with the designated vehicle. The processor subsystem then indicates to the operator that the key has never been authorized for use with the vehicle by instructing, at step 114, the LED 46 to flash for the preselected time period. The method then proceeds to step 158 where the processor subsystem 48 resets and awaits another key enable code.

Returning to step 112, if the authorization code matches the valet key validation code, the processor subsystem 48 identifies the key 16 as a valid valet key. The processor subsystem 48 then enables the ignition system 14 at step 116 by asserting pin 1, thereby causing the relay 44 to close. The processor subsystem 48 then informs the operator at step 118 that the vehicle has been enabled, and the security system 10 has been disabled, by instructing the LED 46 to generate a solid beam for so long as the security system 10 is disabled and the input line 35 indicates to the processor subsystem 48 that the ignition switch 42 is switched to the RUN position. As the ignition system has now been enabled, the operator may now operate the vehicle, and, if necessary, repeatedly turn the vehicle on and off. This will permit a valet to drive the vehicle to a parking lot and return it several hours later. The method then proceeds to step 158 where the processor subsystem 48 resets to await another key enable code without the security system 10 disabling the automotive vehicle. To disable the indefinite enablement of the ignition system produced when the operator uses the valet key, a valid ignition key 18 is used to reset the security system 10 by contacting the key pad 16, thereby reactivating, in a manner to be more fully described below, a timer associated with the processor subsystem 48 and used to limit the time period during which a valid ignition key will have enabled the ignition system.

Returning now to step 110, if the authorization code matches one of the ignition key enable codes stored in the memory subsystem 50, the processor subsystem 48 determines at step 110 that the key 18 is authorized to enable the ignition system and proceeds to step 122 where the processor subsystem 48 indicates to the operator that the ignition key 18 is authorized to enable the ignition system by instructing the LED 46 to generate a solid light for the preselected time period. Having viewed the solid light generated by the LED 46, the operator may now begin to start the automotive vehicle.

Proceeding to step 124, the processor subsystem 48 initiates a timed enablement of the ignition system by setting a timeout timer, incorporated as part of the processor subsystem 48, to 60 seconds and, at step 126, the ignition system 14 is enabled by the processor subsystem 48 driving pin 8 high, thereby generating a signal along output line 37 which closes the relay 44, and enables the ignition system 14. Continuing on to step 128, the processor subsystem 48 then determines whether the ignition switch 42 is in the RUN position and the engine and drive system 40 is running. More specifically, as the input line 35 connects the RUN contact of the ignition switch 42 to pin 1 of the processor subsystem 48, a voltage will appear at pin 1 if the ignition switch 42 is in the RUN position. Accordingly, if the processor subsystem 48 determines at step 128 that the ignition switch 42 is in the RUN position, as indicated by the presence of a voltage along the input line 35, the processor subsystem 48 returns to step 124 where it will reset the timer for another sixty second timeout. If, however, the ignition switch 42 is in the OFF position, the processor subsystem 48 will proceed to step 130, where it waits one second and then decrements the timeout timer by one second at step 132. Proceeding to step 134, the processor subsystem then determines whether the timer has timed out, i.e. time=0. If the timer has not timed out, the processor subsystem 48 returns to step 128 where it again checks to see if the ignition switch 42 has been moved to the RUN position. If, however, the processor subsystem 48 determines at step 134 that the timer has timed out, the processor subsystem 48 disables the ignition system 14 at step 136 by deasserting pin 1, thereby re-opening the relay 44. After disabling the ignition system 14, the method proceeds to step 158 where the processor subsystem 48 resets and awaits a next key enable code.

Returning now to step 108, if it is determined that the electronic key 18 contacting the key pad 16 is not an ignition key, the device code propagated to the processor subsystem 48 has failed to match the ignition key device code stored in the memory subsystem 50. In this case, the method proceeds to step 138 where it is determined whether the electronic key 18 is a reprogramming key. To do so, the processor subsystem 48 compares the propagated device code to the reprogramming code stored in the memory subsystem 50. If the device code fails to match the reprogramming key code, it is determined that the key used is of a key type not authorized for use with security system 10. Accordingly, at step 140, the processor subsystem 48 would instruct the LED 46 that the key used was invalid, again by causing the LED 46 to flash for a preselected time period. The method would then proceed to step 158 where the processor subsystem 48 resets and awaits a next key enable code.

Returning to step 138, if the device code propagated to the processor subsystem 48 matches the reprogramming key device code stored in the memory subsystem 50, it is determined that the electronic key 18 is a reprogramming key. Continuing to step 142, it is then determined whether the reprogramming key is authorized to reprogram the processor subsystem 48. Specifically, the processor subsystem 48 compares the authorization code propagated thereto to the reprogramming validation code stored in the memory subsystem 50. If the codes fail to match, the processor subsystem 48 has determined that the reprogramming key has not been authorized to reprogram the memory subsystem 50. Accordingly, the method proceeds to step 140 where the processor subsystem 48 would instruct the LED 46 to flash repeatedly for the preselected time period to inform the operator that the reprogramming key being used has not been authorized to reprogram the security system 10.

Returning to step 142, if the authorization code matches the reprogramming key validation code, the processor subsystem 48 has determined that the reprogramming key 18 is authorized to reprogram the memory subsystem 50. To commence reprogramming, the processor subsystem 48 issues a signal to the memory system 38 requesting that the contents of the 1,024 bit non-touch memory component of the memory subsystem 38 be propagated to the processor subsystem 48. The memory system 38 responds to the data request by propagating the contents of the non-touch memory component which contains additional codes to be used in the reprogramming of the memory subsystem 50 to the processor subsystem 48. Specifically, the 1,024 bit non-touch memory component contains several fields, the first being a reprogramming code which identifies the type of reprogramming to be performed by the processor subsystem, either overwriting of existing validation codes with new validation codes, storage of additional validation codes, or modification of the valet code.

Continuing to step 144, the processor subsystem 48 compares the received type reprogramming code with a 48-bit replacement type reprogramming validation code stored in the memory subsystem 50. If the received type reprogramming and replacement type reprogramming validation codes match, the processor subsystem 48 has determined that the existing validation codes should be overwritten with additional key codes propagated to the processor subsystem 48 as part of the non-touch memory component of the memory subsystem 38. Accordingly, at step 146, the processor subsystem overwrites the existing validation codes stored in the memory subsystem 50 with the replacement validation codes contained in the contents of the non-touch memory component of the memory subsystem propagated to the processor subsystem. After overwriting the existing validation codes, the method continues to step 148 where the processor subsystem 48 will inform the operator that the reprogramming key has been validated as authorized to reprogram the security system 10 and the appropriate reprogramming has been performed by again instructing the LED 46 to generate a solid light for the preselected time period. The method then proceeds to step 158 where the processor subsystem will reset and await a next key enable code.

Returning to step 144, if the received type reprogramming code of the non-touch memory component of the memory subsystem 38 does not match the replacement type reprogramming validation code, the method proceeds to step 150 where the received type reprogramming code will then be compared to an addition type reprogramming validation code stored in the memory subsystem 50. If the received type reprogramming code matches the addition type reprogramming validation code, the processor subsystem 48 determines at step 150 that the reprogramming to be performed is to add an additional key code to the contents of the memory subsystem 50. Accordingly, at step 152, an additional 48-bit ignition key validation code contained in the non-touch memory component is stored in the memory subsystem 50 such that, upon a next request to compare an authorization code to a ignition key validation code occurring at step 110, the processor subsystem 48 will compare first, second and third validation codes to the propagated authorization code before determining whether the key is authorized to start the ignition system 14. The method continues to step 148 where the processor subsystem indicates, in the manner previously described, that the reprogramming described above has been successfully competed.

Returning to step 150, if the processor subsystem 48 determines that the received type reprogramming code does not match the addition type reprogramming validation code, the method proceeds to step 154, where the processor subsystem 48 determines if the reprogramming key is a valet type reprogramming key, this time by comparing the received type reprogramming code to the valet type reprogramming validation code. If the two codes do not match, the method continues to step 140 where the processor subsystem 48 instructs the LED 46 to flash for a preselected time period, thereby indicating an attempted use of an invalid reprogramming key. If, however, the two codes match, the method continues to step 156 where the existing 48-bit valet key validation code is overwritten with a new 48-bit valet key validation code contained in the non-touch memory component or, if no 48-bit valet key validation code is stored in the memory subsystem 50, a first valet key validation code contained in the non-touch memory component is stored in the memory subsystem 50. The method then proceeds to step 148 where the processor subsystem 48 again indicates a successful reprogramming of the memory subsystem 50 in the manner previously described.

Thus, there has been described and illustrated herein an apparatus and method for controlling access to electrically actuated devices and systems, for example, automotive vehicles. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. An electronic security system for enabling an actuatable electrical system, comprising:

a relay electrically associated with said system such that said system is disabled when said relay is open and enabled when said relay is closed, said relay being normally open;

controller means having an output connected to said relay for controlling the opening and closing thereof;

means for propagating an encoded signal to said controller means;

said controller means further comprising means for determining whether said received encoded signal contains a first type of authorization code authorized to enable said system, means for closing said relay to enable said system if said received encoded signal contains said first type of authorization code authorized to enable said system and means for opening said relay to disable said system if said received encoded signal contains said first type of authorization code and said system is not actuated within a preselected time period.

2. An electronic security system according to claim 1 and further comprising:

means for determining, if said received encoded signal does not contain said first type of authorization code authorized to enable said system, whether said received encoded signal contains a second type of authorization code authorized to enable said system;

means for closing said relay to enable said system if said received encoded signal contains said second type of authorization code authorized to enable said system.

3. An electronic security system according to claim 2 wherein said controller means further comprises:

storage means for storing at least one validation code of a first type of validation code and for storing at least one validation code of a second type of validation code; and means for comparing said at least one stored validation code of said first type of validation code with said received encoded signal to determine whether said encoded signal contains said first type of authorization code authorized to enable said system; and means for comparing said at least one stored validation code of said second type of validation code with said received encoded signal to determine whether said encoded signal contains said second type of authorization code authorized to enable said system.

4. An electronic security system according to claim 3 and further comprising:

means for determining whether said received encoded signal contains a device code authorized to reprogram said storage means; and means for propagating additional validation codes of either said first type or said second type to said storage means;

wherein said means for determining whether said received encoded signal contains a first type of authorization code authorized to enable said system further comprises means for determining, if said received encoded signal does not contain said device code, whether said received encoded signal contains said first type of authorization code authorized to enable said system.

5. An electronic security system according to claim 4 wherein said means for propagating additional validation codes to said storage means further comprises means for selectively overwriting said validation codes with said additional validation codes or storing said additional validation codes in said storage means.

6. In an electronic security for an automotive vehicle having an engine/drive system, an electrical ignition system which controls the operation thereof and a relay, said electrical ignition system electrically connected to said engine/drive system via said relay, said electronic security system having a computer electrically connected to said relay to generate electrical signals which selectively enable or disable said ignition system by closing or opening said relay, a method of selectively enabling said ignition system after said ignition system has been disabled by said computer by opening said relay, comprising the steps of:

propagating an authorization code to said computer;

determining, by said computer, whether said propagated authorization code is of a first type of authorization code authorized to enable said disabled ignition system; and generating, by said computer, an enabling electrical signal which closes said relay if said propagated authorization code is of said first type of authorization code authorized to enable said disabled ignition system;

if said propagated authorization code is of said first type of authorization code, initiating, by said computer, a countdown of a preselected time period;

periodically determining, by said computer, during said countdown, if said engine/drive system has been switched on using said electrical ignition system; and generating, by said computer, a disabling electrical signal which opens said relay if said countdown reaches zero and said engine/drive system remains switched off.

7. A method of selectively enabling a disabled ignition system for an automotive vehicle according to claim 6 wherein said computer further comprises a processor subsystem and a memory subsystem electrically connected with each other for bi-directional transfers of data therebetween and wherein the step of determining whether said propagated authorization code is said first type of authorization code authorized to enable said disabled ignition system further comprises the steps of:

storing at least one authorization code of said first type of authorization code authorized to enable said disabled ignition system in said memory subsystem; and comparing said propagated authorization code to said at least one stored authorization code of said first type to determine if said propagated authorization code is authorized to enable said disabled ignition system.

8. A method of selectively enabling a disabled ignition system for an automotive vehicle according to claim 7 and further comprising the step of:

storing at least one authorization code of a second type of authorization code authorized to enable said disabled ignition system.

9. A method of selectively enabling a disabled ignition system for an automotive vehicle according to claim 8 and further comprising the steps of:

determining, by said computer, whether said propagated authorization code is of said second type of authorization code authorized to enable said disabled ignition system; and generating, by said computer, an enabling electrical signal which closes said relay if said propagated authorization code is of said second type of authorization code authorized to enable said disabled ignition system.

10. A method of selectively enabling a disabled ignition system for an automotive vehicle according to claim 9 and further comprising the steps of:

if said propagated authorization code fails to match one of said at least one stored authorization codes of said first type, comparing, by said computer, said propagated authorization code to said at least one stored authorization code of said second type;

generating, by said computer, an enabling electrical signal which closes said relay if said propagated authorization code matches one of said at least one stored authorization code of said second type.

11. A method of selectively enabling a disabled ignition system for an automotive vehicle according to claim 10 and further comprising the steps of:

restarting said countdown of said preselected time period if said computer determines that said engine/drive system has been switched on;

periodically determining during said restarter countdown if said engine/drive system has been switched on using said electrical ignition system; and generating, by said computer, a disabling electrical signal which opens said relay if said restarted countdown reaches zero and said engine/drive system has not been switched on.

12. A method of selectively enabling a disabled ignition system for an automotive vehicle according to claim 10 and further comprising the steps of:

propagating a second authorization code to said computer after said computer has generated an enabling electrical signal which closes said relay if said propagated authorization code is of said second type of authorization code authorized to enable said disabled ignition system;

comparing said second propagated authorization code to said at least one stored authorization code of said first type;

generating, by said computer, an enabling electrical signal which closes said relay if said propagated authorization code is of said first type of authorization code authorized to enable said disabled ignition system;

if said propagated authorization code is of said first type of authorization code, initiating, by said computer, said countdown of said preselected time period;

periodically determining, by said computer, during said countdown, if said engine/drive system has been switched on using said electrical ignition system; and generating, by said computer, a disabling electrical signal which opens said relay if said countdown reaches zero and said engine/drive system remains switched off.

13. A method of selective enabling a disabled ignition system for an automotive vehicle according to claim 12 and further comprising the steps of:

restarting said countdown of said preselected time period if said computer determines that said engine/drive system has been switched on;

periodically determining during said restarted countdown if said engine/drive system has been switched on using said electrical ignition system; and generating, by said computer, a disabling electrical system which opens said relay if said restarted countdown reaches zero and said engine/drive system has not been switched on.

\* \* \* \* \*